(12) United States Patent
Kojima et al.

(10) Patent No.: US 6,950,633 B2
(45) Date of Patent: Sep. 27, 2005

(54) ROTARY NON-CONTACT CONNECTOR AND NON-ROTARY NON-CONTACT CONNECTOR

(75) Inventors: Tetsuya Kojima, Nagano-ken (JP); Akifumi Arai, Nagano-ken (JP); Hiroyuki Koitabashi, Aichi-ken (JP)

(73) Assignees: Tamagawa Seiki Kabushiki Kaisha, Nagano-Ken (JP); Chubu Nihon Maruki Co., Ltd., Aichi-Ken (JP)

(*) Notice: Subject to any disclaimer, the term of this patent is extended or adjusted under 35 U.S.C. 154(b) by 489 days.

(21) Appl. No.: 10/038,582

(22) Filed: Jan. 8, 2002

(65) Prior Publication Data

US 2002/0132589 A1 Sep. 19, 2002

(30) Foreign Application Priority Data

Mar. 16, 2001 (JP) ........................ 2001-076690

(51) Int. Cl.$^7$ ............................... H04B 1/38
(52) U.S. Cl. ............. 455/73; 455/74; 455/106; 455/575.7; 455/575.5; 455/575.1; 455/107; 455/550.1; 343/702; 343/906; 343/878; 343/880; 343/882; 336/119; 336/120; 333/260; 333/261
(58) Field of Search ............. 455/73, 74, 106, 455/575.7, 575.1, 575.5; 375/219; 343/702, 906, 882, 880; 336/116

(56) References Cited

U.S. PATENT DOCUMENTS

| 4,514,645 A | 4/1985 | Endo et al. |
| 6,118,192 A * | 9/2000 | Karidis ..................... 310/68 R |
| 6,147,416 A * | 11/2000 | Mitsuzuka .................. 307/10.1 |
| 6,169,339 B1 * | 1/2001 | Cripe ........................... 307/17 |
| 6,201,338 B1 * | 3/2001 | Naito et al. ............. 310/323.05 |
| 6,255,800 B1 * | 7/2001 | Bork ........................... 320/115 |
| 6,392,561 B1 * | 5/2002 | Davies et al. ............. 340/854.3 |

FOREIGN PATENT DOCUMENTS

| EP | 0 183 580 A1 | 6/1986 |
| EP | 183 589 A1 | 6/1986 |
| EP | 1 000 812 A2 | 5/2000 |
| EP | 1 077 144 A2 | 2/2001 |
| JP | 60-029711 | 2/1985 |
| JP | 07-039077 | 2/1995 |
| JP | 2000-092752 | 3/2000 |

* cited by examiner

*Primary Examiner*—Marceau Milord
(74) *Attorney, Agent, or Firm*—Sughrue Mion, PLLC

(57) ABSTRACT

A rotary non-contact connector and a non-rotary non-contact connector enable data transmission in a non-contact mode by radio transmitters-receivers by combining rotary transformers or stationary transformers and radio transmitters-receivers, and providing power systems with buffer functions by a storage means to receive supplied electric power. Each of the rotary non-contact connector and the non-rotary non-contact connector has first and second radio transmitters-receivers provided between a rotor and an annular stator of a rotary transformer and between first and second stationary members of a stationary transformer to permit two-way radio data communication in a non-contact mode. Furthermore, storage means are provided to implement a buffering function for a power system.

3 Claims, 3 Drawing Sheets

ROTARY NON-CONTACT CONNECTOR AND NON-ROTARY NON-CONTACT CONNECTOR

BACKGROUND OF THE INVENTION

1. Field of the Invention

The present invention relates to a rotary non-contact connector and a non-rotary non-contact connector. More particularly, the present invention relates to a novel improvement in implementing single-channel or multi-channel signal transmission based on non-contact radio communication by using the rotary non-contact connector or the non-rotary non-contact connector. In the case of the rotary non-contact connector, a rotor of a rotary transformer is equipped with a rotating-side radio transceiver, and electric power from an external source is supplied through the intermediary of the rotary transformer to an electric circuit for driving the rotating-side radio transceiver. In the case of the non-rotary non-contact connector, the electric power from an external source is supplied through the intermediary of a stationary transformer to an electric circuit for driving a radio transceiver at a power-supplied side.

2. Description of the Related Art

Hitherto, signal transmission between a stationary unit and a rotating-side unit has been effected by connecting, for example, a rotating-side unit mounted on a gimbal mechanism having a plurality of rotating shafts or a single-shaft rotating platform and a stationary-side unit by using a rotary joint or slip ring and a contact connection type connector, and eventually by direct coupling to the contact connection type connector.

Great efforts have been made to obviate the need for the use of wiring, and the non-contact data transfer has become significantly easier owing to the progress in the recent close-range radio communication technology. However, it has been difficult to achieve supply of electric power from a stationary unit to a rotating-side unit in a non-contact mode, and the need for the wire for supplying power still remains, making it difficult to completely eliminate wiring.

The conventional transmission of signals between a stationary unit and a rotating-side unit described above has been presenting the following problems.

Specifically, the connection method based on a contact type connector and the direct coupling wiring method for connecting a stationary unit and a rotating-side unit inevitably produce parasite drag generated due to the twist or rigidity of wiring even when only rotational motion of finite angles is involved.

The rotary joint or slip ring method has been posing such problems as larger sizes, higher cost, and lower environmental resistance although it has less likelihood of the occurrence of the parasite drag attributable to the twist or rigidity of wiring.

SUMMARY OF THE INVENTION

The present invention has been made with a view toward solving the above problems, and it is an object of the present invention to provide a rotary non-contact connector and a non-rotary non-contact connector adapted to perform single- or multi-channel signal transmission based on radio communication in a non-contact mode.

In the rotary non-contact connector for signal transfer between a stationary unit and a rotating-side unit, a rotating-side radio transceiver is mounted on a rotor or a connected member with its rotor to construct a data communication system for transmitting or receiving signals to or from the rotating-side unit. An electric power is supplied from the stationary unit through the intermediary of the rotary transformer.

For the non-rotary non-contact connector to transfer signals between two faced units that are not in contact and whose relative faced positions remain unchanged, a radio transceiver is mounted on one of the two faced units or their connected members, and a radio transceiver is also mounted on the other of the two faced units or its connected members such that they oppose each other, thereby making up a data communication system to transfer signals between two units. For a power system, a transformer that has an extremely small gap between the two non-contacting units is formed to supply electric power from one to the other.

According to one aspect of the present invention, there is provided a rotary non-contact connector including a rotary transformer composed of a rotor that has a rotating-side transformer winding and an annular stator that is concentric with the rotor and has a stator-side transformer winding, a rotating-side radio transceiver provided on the rotor, and a stationary-side radio transceiver that is fixedly disposed to oppose the rotating-side radio transceiver, wherein electric power is supplied to the rotor through the rotary transformer to perform radio communication.

Preferably, a non-magnetic and non-magnetized bearing is provided between the rotor and the annular stator.

Preferably, an electric circuit for driving the rotating-side radio transceiver is provided on the rotor, and electric power is supplied to the electric circuit through the rotary transformer.

Preferably, a power output terminal of the rotary transformer is divided into two terminals, one terminal being directly coupled to the electric circuit, while the other terminal being coupled to the electric circuit through the intermediary of storage means composed of a capacitor or a storage cell.

Preferably, one or a plurality of the rotating-side radio transmitters-receivers are provided directly on the rotor or a mounting plate connected to a part of the rotor.

Preferably, the rotating-side radio transceiver or the stationary-side radio transceiver has at least an antenna.

According to another aspect of the present invention, there is provided a non-rotary non-contact connector including a first stationary member having a first transformer winding, a second stationary member that is disposed to oppose the first stationary member and has a second transformer winding, a first radio transceiver provided on the first stationary member, and a second radio transceiver provided on the second stationary member, wherein electric power is supplied to the first stationary member or the second stationary member on the power-supplied side by means of magnetic coupling between the transformer windings to perform radio communication between the radio transmitters-receivers.

Preferably, an electric circuit for driving the first radio transceiver or the second radio transceiver in the first stationary member or the second stationary member on the power-supplied side is provided, and electric power is supplied to the electric circuit through the first transformer winding or the second transformer winding on the power-supplied side.

Preferably, a power output terminal of the first transformer winding or the second transformer winding on the power-supplied side is divided into two terminals, one terminal being directly coupled to the electric circuit, while the other terminal being coupled to the electric circuit through the intermediary of storage means composed of a capacitor or a storage cell.

Preferably, one or a plurality of the first radio transmitters-receivers or the second radio transmitters-receivers are provided directly on the first stationary member or the second stationary member on the power-supplied side, or on a structural member connected to a part of the first stationary member or the second stationary member on the power-supplied side.

Preferably, the first radio transceiver or the second radio transceiver has at least an antenna.

DESCRIPTION OF THE PREFERRED EMBODIMENTS

Figure 1:
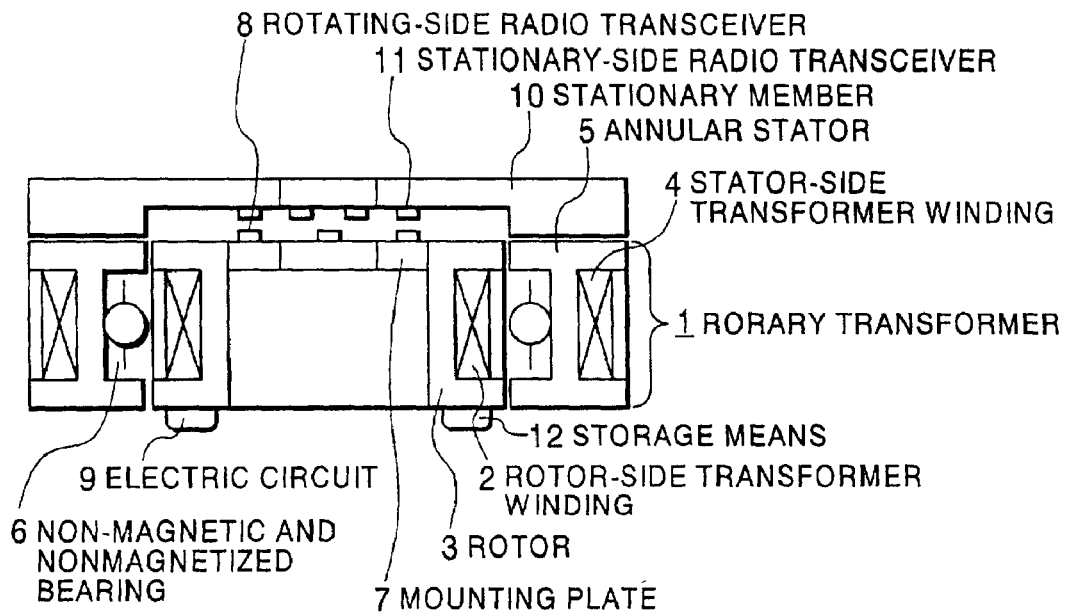
FIG. 1 is a sectional view of a rotary non-contact connector according to an embodiment of the present invention.
Figure 2:
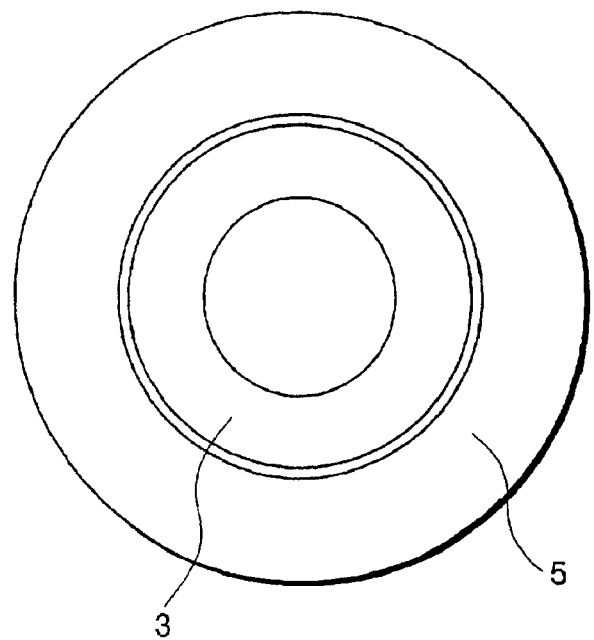
FIG. 2 is a top plane view of an essential section of the rotary non-contact connector shown in FIG. 1.
Figure 3:
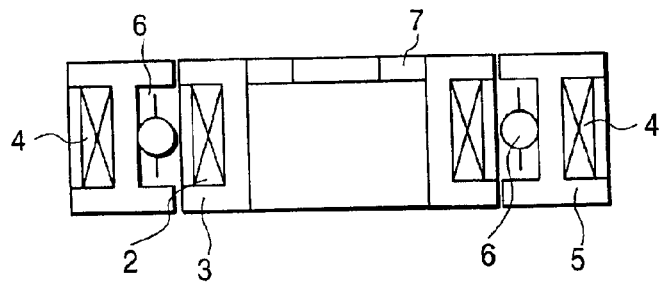
FIG. 3 is a sectional view of the essential section of the rotary non-contact connector shown in FIG. 1.
Figure 4:
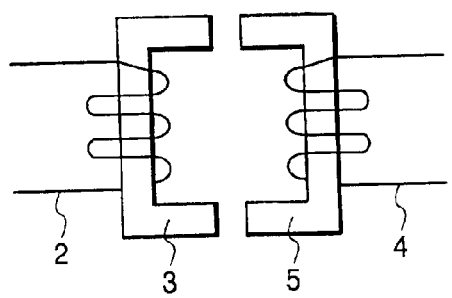
FIG. 4 is a schematic diagram of the essential section of the rotary non-contact connector shown in FIG. 1.

Preferred embodiments of a rotary non-contact connector and a non-rotary non-contact connector in accordance with the present invention will be described in conjunction with the accompanying drawings.

Referring to FIG. 1 through FIG. 4, reference numeral 1 denotes a rotary transformer acting as a non-contact power supplying unit. The rotary transformer 1 is comprised of a hollow (or solid) rotor 3 having a rotor-side transformer winding 2, and an annular stator 5 that is provided concentrically with the rotor 3 and around the outer periphery of the rotor 3 and has a stator-side transformer winding 4. The annular stator 5 shown in the drawing is positioned around the outer periphery to illustrate the case where the rotor is inside the stator; however, the annular stator 5 may alternatively be positioned on the inner periphery of the rotor 3, because the present invention also includes a case where the rotor is outside the stator.

A non-magnetic and non-magnetized bearing 6 is provided on the inner wall of the annular stator 5 (or on the outer wall if the annular stator 5 is positioned on the inner periphery of the rotor 3 of the annular stator 5). The non-magnetic and non-magnetized bearing 6 is disposed between the annular stator 5 and the rotor 3. In some cases, the non-magnetic and non-magnetized bearing 6 is not used. If the bearing 6 is not used, then it is possible to connect the rotor 3 to a rotating member of an apparatus to which the connector is applied, and connect the annular stator 5 to a stationary member of the apparatus to which the connector is applied, thereby positioning the rotor 3 and the annular stator 5.

An electric circuit 9 for driving a rotating-side radio transceiver 8 is mounted on the rotor 3, and the electric power can be received from outside via the rotary transformer 1. The electric circuit 9 may alternatively be provided on a rotating member other than the rotor 3.

Figure 6:
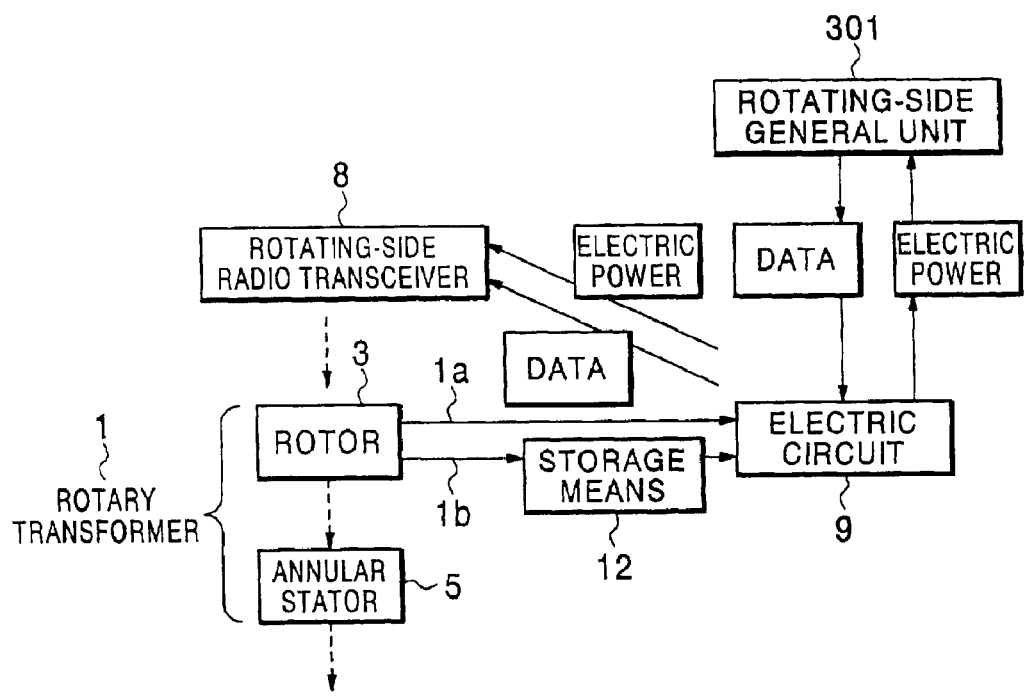
FIG. 6 is a diagram primarily showing the buffer function of a power system in the present invention.

It is needless to say that the electric power from an external source, which has passed through the rotary transformer 1, is supplied to the electric circuit 9 directly or through the intermediary of a storage means 12 composed of a capacitor or a lithium battery, and can be supplied to other general units (not shown) on the rotating side in addition to the radio transmitters-receivers. Thus, the storage means 12 has a buffer function for a power system. FIG. 6 shows the configuration wherein a rotating-side general unit 301 has been connected to the rotary transformer 1 shown in FIG. 1.

More specifically, the electric power from an external source is supplied to the electric circuit 9 through the intermediary of the storage means 12 and also stored at the storage means 12. The electric power from the storage means 12 can be supplied to the rotating-side general unit 301 and the rotating-side radio transceiver 8 via the electric circuit 9. For this reason, the power output terminal of the rotary transformer 1 is devided into one terminal 1a and the other terminal 1b, and the one terminal 1a is directly connected to the electric circuit 9, while the other terminal 1b is connected to the electric circuit 9 through the intermediary of the storage means 12.

A mounting plate 7 is provided on a part of the rotor 3. One or a plurality of the rotating-side radio transmitters-receivers 8 are provided on the mounting plate 7 (or directly on the rotor if there is no need to provide the mounting plate). As an alternative, the rotating-side radio transceiver or transmitters-receivers 8 may be included in the electric circuit 9 or another rotating-side unit (not shown) in order to improve the functions and performance or the structural configuration of the entire electric circuit of the rotating-side unit including the rotating-side radio transceiver 8.

Outside the annular stator 5, a stationary member 10 is provided to cover the rotor 3 and the annular stator 5. One or a plurality of stationary-side radio transmitters-receivers 11 are provided at the positions of the stationary member 10 that oppose the rotating-side radio transmitters-receivers 8. The stationary member 10 may be fixed to the annular stator 5 or mounted on the stationary unit of an apparatus (not shown).

When the electric power from an external source is supplied to the electric circuit 9 through the intermediary of the rotary transformer 1, and various types of data from the electric circuit 9 are supplied to the rotating-side radio transceiver 8 (hereinafter, the rotating side will be set to have a transmitting function), the rotating-side radio transceiver 8 transmits radio waves on the basis of the transmitted command signals, and the signals are received by the stationary-side radio transceiver 11 (hereinafter, the stationary side will be set to have a radio wave receiving function). Thus, the data is transmitted from the rotating-side radio transceiver 8 to the stationary-side radio transceiver 11 by radio communication, allowing the non-contact system to accomplish the same operation performed by a mechanical connector or slip ring. The functional relationship between the rotating-side radio transceiver 8 and the stationary-side radio transceiver 11 may be reversed as a matter of course, and provided side by side to enable multi-channel bidirectional radio communication to be achieved. The above radio transmitters-receivers 8 and 11 are composed primarily of antennas, radio equipment main units, modems, memories, and the controllers for linking to a rotating-side or stationary-side unit.

Moreover, the data signals output from the rotating-side radio transceiver 8 and the stationary-side radio transceiver 11 can be taken out through the intermediary of the rotor-side transformer winding 2 and the stator-side transformer winding 4.

Figure 5:
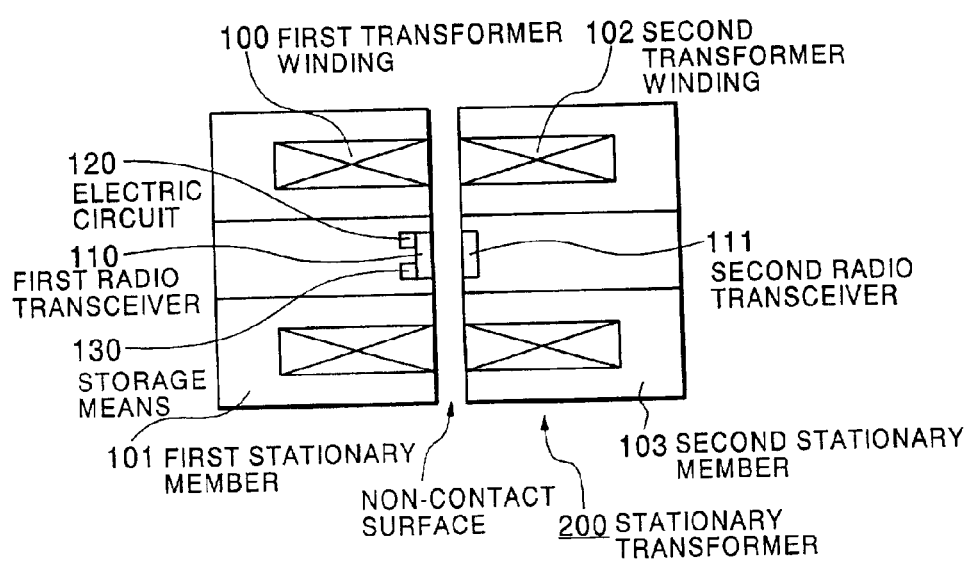
FIG. 5 is a diagram showing a configuration of a non-rotary non-contact connector according to another embodiment of the present invention.

FIG. 5 shows the configuration of a non-rotary non-contact connector according to another embodiment. For instance, a first stationary member 101 is set to be on the rotating side in the above rotary non-contact connector, and a second stationary member 103 is set to be on the stationary side in the above rotary non-contact connector (this relationship may be reversed).

More specifically, electric power is supplied from the second stationary member 103 to the first stationary member 101, so that the first stationary member 101 is on the power-supplied side. According to this setting, the rotary transformer 1 in the aforesaid rotary non-contact connector corresponds to a stationary transformer 200, and the correspondence of the individual components of the rotating side and the stationary side will be as follows. The foregoing rotor-side transformer winding 2, which is a component of the rotating side, corresponds to a first transformer winding 100, the foregoing rotor 3 and the mounting plate 7 correspond to the first stationary member 101, the foregoing rotating-side radio transceiver 8 corresponds to a first radio transceiver 110, the foregoing electric circuit 9 corresponds to an electric circuit 120, and the foregoing storage means 12 corresponds to a storage means 130. Similarly, on the stationary side, the foregoing stator-side transformer winding 4 corresponds to a second transformer winding 102, the foregoing annular stator 5 and the stationary member 10 correspond to a second stationary member 103, and the foregoing stationary-side radio transceiver 11 corresponds to a second radio transceiver 111. obviously, therefore, it is possible to supply the electric power, which has been supplied to the electric circuit 120 by making use of the electromagnetic induction between the transformer windings 100 and 102, to the first radio transceiver 110 through wiring (not shown), and to also feed the electric power to other general devices or the like on the power-supplied side (not shown).

Furthermore, the data signals output from the radio transceiver 110 or the radio transceiver 111 can be taken out electromagnetically to through the transformer winding 100 or 102.

As is obvious from the correspondence of the components mentioned above, the non-rotary non-contact connector and the rotary non-contact connector basically share the same configuration and functions. The meaning of the term "non-contact" in the non-rotary non-contact connector also includes a condition wherein the first stationary member 101 and the second stationary member 103 shown in FIG. 5 are "in contact" on a non-contact surface D whereon the first radio transceiver 110 and the second radio transceiver 111 oppose each other. The designation, non-rotary "non-contact" connector implies that the connector is able to function also in the non-contact condition. One or a plurality of radio transmitters-receivers 110 and 111 are provided directly on the first and second stationary members 101 and 103, or on the component (not shown) connected to a part of each of the first and second stationary members 101 and 103.

The connection relationship among the rotary transformer 1, the storage means 12, and the electric circuit 9 shown in FIG. 6 also applies to the stationary transformer 200 shown in FIG. 5, and provides the function for charging the storage means 12 and the function as a buffer between the storage means 12 and the electric circuit 9. Hence, in both the rotary non-contact connector and the non-rotary non-contact connector, the configuration of the electric power source depends on a required condition of the electric power to be consumed. To be more specific, whether the configuration in which the electric power going through the intermediary of the rotary transformer 1 in the case of the rotary non-contact connector or through the stationary transformer 200 in the case of the non-rotary non-contact connector is always supplied directly to the electric circuit 9 or 120, or the configuration in which the electric power is supplied to the electric circuit 9 or 120 always through the intermediary of the storage means should be selected according to a required condition of the electric power to be consumed. Hence, the above configurations are obviously included in the configurations wherein the output power of the rotary transformer or the stationary transformer is supplied to the electric circuit 9 directly and through the intermediary of the storage means.

The descriptions have been given of the electric circuit 9 on the rotating-side unit in the case of the rotary non-contact connector, and of the electric circuit 120 on the power-fed unit in the case of the non-rotary non-contact connector. It is needless to say that the electric circuit is also provided on the stationary unit in the case of the rotary non-contact connector, or on the power-fed unit in the case of the non-rotary non-contact connector, although it is not shown. The functions of the electric circuit on the stationary unit or the power-fed unit are identical to the functions of the electric circuit 9 or 120 on the rotating-side unit or the power-fed unit. To be more specific, the electric circuit functions to supply electric power and generate transmission commands or reception signals. However, the functions are not described because the installation place of the electric circuit should not limited to within the connector. Furthermore, for the same reason, the existence of the storage means for the input of the electric circuit on the stationary unit remains optional.

By virtue of the features described above, the rotary non-contact connector in accordance with the present invention provides the following advantages. The combination of the rotary transformer and the coupling means for radio communication allows data communication between a radio transmitter and a radio receiver in a non-contact mode while receiving electric power supplied from an external source. This arrangement makes it possible to transfer data easily and reliably in the non-contact mode in detectors, drive units, etc. in various types of apparatuses. In the non-rotary non-contact connector, the supply of electric power and the transfer of signals can be accomplished in a stationary non-contact mode.

What is claimed is:

1. A rotary contactless connector comprising:

a rotary transformer composed of a rotor defining a rotary side and having a transformer rotary winding and an annular stator defining a stationary side and being concentric with the rotor and having a transformer stator winding;

a plurality of rotating side elements, comprising at least one of rotating-side radio wave transmitting elements or rotating-side radio wave receiving elements, provided on the rotor;

a plurality of stationary side elements, comprising at least one of stationary-side radio wave transmitting elements or stationary-side radio wave receiving elements, that are disposed for radio wave-based coupling with the rotating-side elements, and a switching circuit disposed on at least one of said stationary side and said rotary side, and being operative to switchably couple at least one of said plurality of rotating side elements to at least one of said plurality of stationary side elements, wherein electric power is supplied to the rotor through the rotary transformer to enable radio wave-based communication, wherein a plurality of said rotary side elements are arranged along a common circumferential locus and comprise only one of radio wave transmitting or light receiving elements, wherein an output of two radio wave emitting elements does not enter a range of one radio wave receiving element at the same time, and wherein one radio wave emitting element output enters the range of two radio wave receiving elements at the same time, whereby said switching device is controlled to provide continuous radio wave-based communication as said rotor is rotated.

2. A rotary contactless connector comprising:

a rotary transformer composed of a rotor defining a rotary side and having a transformer rotary winding and an annular stator defining a stationary side and being concentric with the rotor and having a transformer stator winding;

a plurality of rotating side elements, comprising at least one of rotating-side radio wave transmitting elements or rotating-side radio wave receiving elements, provided on the rotor;

a plurality of stationary side elements, comprising at least one of stationary-side radio wave emitting elements or stationary-side radio wave receiving elements, that are disposed for radio wave-based coupling with the rotating-side elements, and a switching circuit disposed on at least one of said stationary side and said rotary side, and being operative to switchably couple at least one of said plurality of rotating side elements to at least one of said plurality of stationary side elements, wherein electric power is supplied to the rotor through the rotary transformer to enable radio wave-based communication, wherein, a first plurality of said rotary side elements are arranged along a first common circumferential locus and comprise at least light transmitting elements, and a second plurality of said rotary side elements are arranged along a second common circumferential locus and comprise at least radio wave receiving elements, and wherein said first plurality of rotary side elements and said second plurality of rotary side elements are coupled to stationary side elements and are adapted to provide simultaneous bidirectional communication.

3. The rotary contactless connector according to claim 2 wherein said radio wave-based coupling between rotary side elements and stationary side elements is a switched coupling.

* * * * *